June 19, 1934. F. BISZANTZ Re. 19,213

GRAVE VAULT

Original Filed March 12, 1931

Inventor

Fred Biszantz

By Frederick S. Lee,

Attorney

Reissued June 19, 1934 Re. 19,213

UNITED STATES PATENT OFFICE 19,213

GRAVE VAULT

Fred Biszantz, Galion, Ohio, assignor to Marion Vault Manufacturing Company, Marion, Ohio, a corporation of Ohio Original No. 1,856,309, dated May 3, 1932, Serial No. 522,067, March 12, 1931. Application for reissue December 21, 1933, Serial No. 703,477

10 Claims. (Cl. 27—35)

This invention relates to grave vaults and particularly to means for sealing the joint between the cover or dome of the vault and the base thereof.

In vaults known to me, the cover or dome of the vault rests upon a base whose edges turn outward giving the effect of a pan, upon which the cover of the vault is seated, thus taking away from the apparent solidity of the vault and from its ornamental character.

One of the objects of the present invention is to do away with or eliminate this "pan" effect and provide a vault so constructed as to secure added strength, durability and positive protection while providing a base serving as a firm foundation upon which the casket and body may rest and also provide means whereby the dome of the vault may be locked to the base.

A further object is to provide a base, which, while hollow, has all the effect of a solid slab of stone and which has a firm seat on the bottom of the grave within which the vault is to be placed.

A further object of the invention is to provide means for effectively sealing the joint between the cover or dome of the vault and the base which extends upward within the lower portion of the cover or dome, and another object in this connection is to provide means for holding a gasket firmly in place within the cover so that when the cover is placed upon the base, the gasket will engage the margin of the base and thus prevent any shifting of the gasket which would be the case were the gasket merely disposed upon the base itself.

Other objects will appear in the course of the following description.

My invention is illustrated in the accompanying drawing, wherein:—

Figure 1:
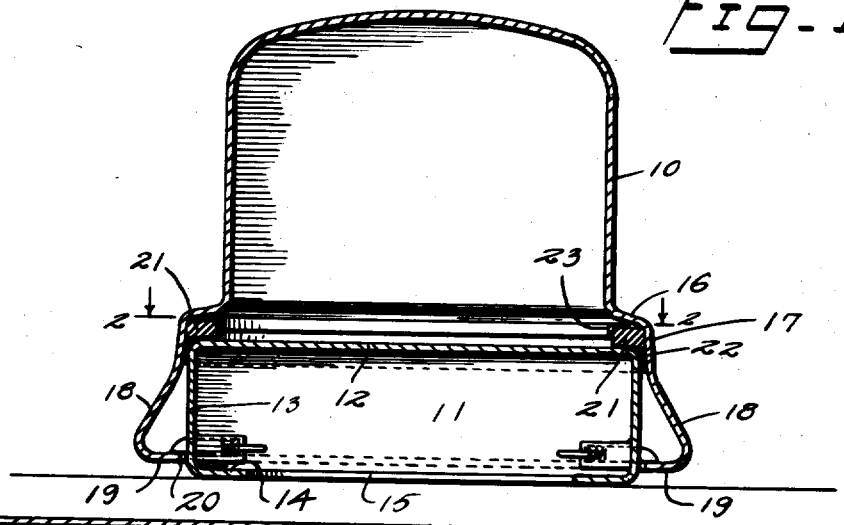
Figure 1 is a vertical transverse sectional view through a vault constructed in accordance with my invention.
Figure 2:
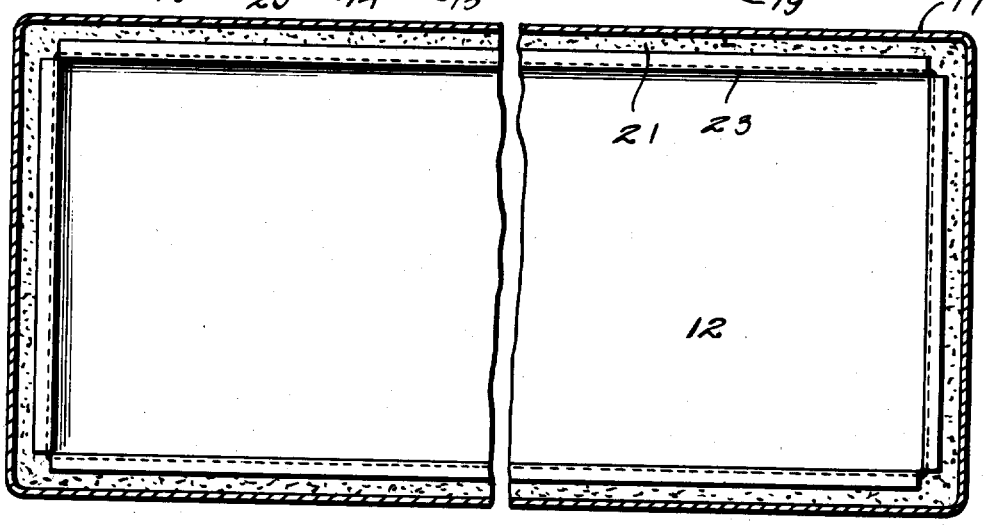
Figure 2 is a horizonal section on the line 2—2 of Figure 1 and looking in the direction of the arrows.
Figure 3:
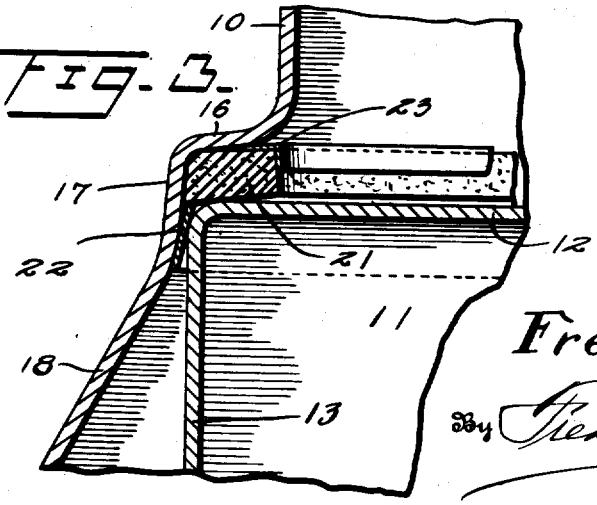
Figure 3 is an enlarged fragmentary vertical section of the cover and base of the vault showing the gasket and its holding means.

Referring to the drawing, 10 designates the dome or what I have termed the cover section of the vault and 11 a base for the dome. This base is hollow to provide a top wall 12, side wall 13 and an inwardly extending flange 14 defining an opening 15. The wall cover 10 adjacent its lower portion is outwardly angled as at 16, then downwardly extended as at 17, then outwardly flared as at 18 and then inwardly extended as at 19, this inward extension defining an opening 20 which is sufficiently large to receive easily the base 11.

Disposed immediately beneath the angular portion 16 is a gasket 21 which fits within the corner formed at the junction of the portions 17 and 16. This gasket is held in place by metallic strips 22 and by angles 23. The strips and angles 22 and 23 are disposed on all four sides of the vault and thus are practically continuous except the corners. In putting the gasket in place, the edge of the gasket is tucked under the angular portion 16 between the upper edge of the strip 22 and this angular portion and is then pressed into position within the angle strip 23.

The angle strip 23 and the flat strip 22 are both spot-welded to the inside face of the vault cover.

It will be seen that when the cover is put in place, the portion 16 will bear against the upper face of the gasket, while the gasket will bear against the upper face of the margin of the base 11, thus entirely sealing the interior of the vault. The skirt or basal portion 18 of the cover extends downward and outward and then extends inward so as to provide an inwardly extending flange 19 with which the usual locking bolts 24 mounted within the base may engage. These locking bolts may be of any suitable construction but are preferably spring-projected bolts. It will be seen that the inwardly turned flange 19 is disposed slightly above the bottom 14 of the base, thus permitting the gasket 21 to be tightly pressed against the top of the base 11 before the flange 19 comes in contact with any object which might prevent a full setting of the dome or cover upon the gasket 21. It will thus be seen that a thoroughly tight seal will be provided against the inlet of moisture. Moisture may gather within the skirt portion 18, but it cannot rise to the surface of the base 11 nor pass the compressed gasket 21. This construction keeps the vault moisture and vermin-proof without great care or expense.

In all other vaults known to me having a dome or cover and a base, the base has an outwardly extending lower flange upon which the lower edge of the cover rests. The edge, therefore, projects out beneath the cover or dome like a pan and this is not desirable for a number of reasons. For one thing, this pan effect does not suggest solidity and from a mechanical point of view, the outwardly projecting flange is bad because its edge bears against the straps by which the vault is lowered into the grave and tends to cut these straps. Furthermore particles of dirt may lodge beneath the lower flanged edge of the cover and between the outward flange of the base and the flange of the cover preventing proper closing of the vault. If the outwardly projecting flange on the base is removed so that the base has sides extending straight downward, the sides would cut into the ground and the base would sink. If the dome did not rest upon the upper edge of the base, as in my present construction, there would be but little support beneath the lower edge of the dome and the dome would be likely to sink little by little into the ground with relation to the base or one end might sink further than the other and as a consequence, the seal will be broken. By having the dome rest upon the margin of the base, however, a full support is given to the dome and the dome moves downward with the base and not independently thereof.

It will be seen that my vault not only provides for an air seal, but also for a gasket seal, thus securing a double protection against the inlet of air or moisture.

I obviously do not wish to be limited to the exact details of the construction illustrated as these might be changed in many ways without departing from the spirit of the invention as defined in the appended claims.

I claim:—

1. In a grave vault, a base having a substantially flat upper surface and vertical side and end walls intersecting the flat upper surface and a vaulted cover for the base having side and end walls, the horizontal cross sectional area of the cover immediately above the base being less than the area of the upper surface of the base and the cover then extending downwardly around the base and terminating below the top of the base, that portion of the cover immediately above the base and above the lower edge of the cover constituting a supporting shoulder for the cover which is substantially parallel with, superjacent to and confronts the margin of the upper face of the base whereby to permit the cover to be supported upon the upper face of the base.

2. A grave vault comprising a hollow base having a flat upper face and vertically extending side walls, a cover, the upper portion of which is less in horizontal cross sectional area than the area of the base, said cover adjacent its lower edge being outwardly extended in all directions, then downwardly and outwardly extended to approximately fit the upper portion of the base, then inwardly extended and terminating below the upper face of the base, the outer margin of the upper face of the base and the outwardly extending portion of the cover confronting each other around the entire margin of the upper, flat face of the base whereby a seal may be effected between said confronting portions and whereby the cover will be supported entirely upon the base itself.

3. In a grave vault, a base having upstanding side walls and an upper horizontal wall, a cover for the base, the upper portion of the cover being smaller in cross sectional area than the area of the base, the cover adjacent its lower end being outwardly extended, then downwardly extended to fit over the top of the base, and a gasket mounted below the outwardly extended portion of the cover and against the downwardly extended portion, and strips attached to the cover and embracing the gasket and holding it in place.

4. In a grave vault, a base having upstanding side walls and an upper horizontal wall, a cover for the base, the upper portion of the cover being smaller in cross sectional area than the area of the base, the cover adjacent its lower end being outwardly extended, then downwardly extending to fit over the top of the base, and a gasket mounted below the outwardly extended portion of the cover and against the downwardly extended portion, an angle strip attached to the lower face of the outwardly extended portion of the cover and engaging the upper corner of the gasket, and a flat strip attached to the downwardly extended portion of the cover and extending upward and inward at an angle and engaging against the under face of the gasket.

5. A grave vault comprising a hollow base having a flat upper face and vertically extending side walls, a cover, the upper portion of which is less in cross sectional area than the area of the base, said cover adjacent its lower end being outwardly extended, then downwardly extended to approximately fit the upper portion of the base, then being downwardly and outwardly extended and then inwardly extended, a gasket disposed beneath the outwardly extended portion of the cover and bearing against the downwardly extended portion thereof, said gasket being adapted to rest upon the outer margin of the upper face of the base, and means attached to the inside of the cover for holding said gasket in place.

6. In a grave vault, a base having a flat, upper surface, and a vaulted cover for the base having approximately vertical side and end walls, the cross sectional area of the space defined by said walls being less than the area of the flat upper surface of the base whereby the base projects out in all directions beyond the upper portion of the vaulted cover, the cover at the lower ends of its walls being outwardly extended beyond the base and then downwardly extended to fit over the base, and a gasket disposed between the upper surface of the base and the outwardly extending portion of the cover, the gasket being disposed entirely around the margin of the upper surface of the base.

7. In a grave vault, a base having a flat, upper surface and vertical side walls, a vaulted cover for the base, the upper portion of the cover having approximately vertical side and end walls, the cross sectional area of the space defined by said vertical walls being less than the area of the flat upper surface of the base, the cover at the lower ends of the vertical portions of its walls being outwardly extended and then downwardly extended to fit over the base, and a gasket disposed between the outwardly extending portion of the cover and the margin of the upper face of the base and entirely around the base, the lower margin of the cover below this outwardly and downwardly extended portion being inwardly flanged toward the vertical wall of the base, and locking devices mounted within the base and having bolts projecting out through the side walls thereof and over said inwardly extending flanges of the cover.

8. In a grave vault, a base having a flat, upper surface and vertical side walls, a vaulted cover for the base having its upper portion formed with approximately vertical side and end walls, the area defined by these walls being less than the area of the flat upper face of the base, the cover at the lower ends of its walls being outwardly extended and then downwardly and outwardly extended to fit over the base, a gasket disposed between the upper surface of the base entirely around the margin thereof and the outwardly extending portion of the cover, and means on the cover holding the gasket in place within the cover.

9. In a grave vault, a base having a flat upper surface, vertical side walls and an inturned flange, a vaulted cover for the base, the upper portion of the cover having approximately vertical side and end walls, the area defined by said walls being less than the area of the upper surface of the base whereby said side and end walls are disposed inward of the vertical walls of the base, the cover at the lower ends of its vertical portions being outwardly and downwardly extended to fit over the base, and having an inturned flange, a gasket disposed between the upper surface of the margin of the base and the outwardly extending portion of the cover, and a projected locking bolt mounted within the base and projecting out through openings in the vertical walls thereof and engageable with the inwardly extending flange of the cover.

10. In a grave vault, a base having an upper surface and side and end walls, and a vaulted cover for the base, the horizontal cross sectional area of the cover immediately above the base being less than the cross sectional area of the base immediately below its top surface, the cover then extending downwardly around the base, the material of the cover terminating below the top of the base, that portion of the cover immediately above the base and above the lower terminal edge of the cover constituting a shoulder for the cover which is substantially parallel with, superjacent to and confronts the upper margin of the base, at the junction of the side walls and top of the base whereby the cover is supported solely upon the upper margin of the base.

FRED BISZANTZ.